United States Patent
Török et al.

[19]

[11] Patent Number: 6,133,664
[45] Date of Patent: Oct. 17, 2000

[54] SELF-STARTING BRUSHLESS ELECTRIC MOTOR

[75] Inventors: Vilmos Török, Corso Fusina 2, CH-6911 Campione D'Italia, Switzerland; Walter Wissmach, München, Germany; Roland Schaer, Grabs, Switzerland

[73] Assignee: Vilmos Török, Campione D'Italia, Switzerland

[21] Appl. No.: 09/194,693
[22] PCT Filed: May 29, 1997
[86] PCT No.: PCT/SE97/00929
§ 371 Date: Nov. 30, 1998
§ 102(e) Date: Nov. 30, 1998
[87] PCT Pub. No.: WO97/45943
PCT Pub. Date: Dec. 4, 1997

[30] Foreign Application Priority Data

May 30, 1996 [SE] Sweden .................................. 9602118

[51] Int. Cl.[7] .................................................. H02K 37/02
[52] U.S. Cl. .......................................... 310/181; 310/49 R
[58] Field of Search ................................ 310/49 R, 181, 310/179, 180, 168, 156, 154, 254, 216, 261, 152, 184, 185, 258, 166, 162

[56] References Cited

U.S. PATENT DOCUMENTS

| | | | |
|---|---|---|---|
| 3,984,711 | 10/1976 | Kordik | 310/49 R |
| 3,995,203 | 11/1976 | Torok | 318/701 |
| 4,745,312 | 5/1988 | Nagasaka | 310/49 R |
| 5,117,144 | 5/1992 | Torok | 310/269 |
| 5,304,882 | 4/1994 | Lipo et al. | 310/156 |
| 5,345,131 | 9/1994 | Torok | 310/181 |
| 5,532,531 | 7/1996 | Sakamoto | 310/49 R |
| 5,663,605 | 9/1997 | Evans et al. | 310/181 |
| 5,672,925 | 9/1997 | Lipo et al. | 310/154 |
| 5,825,112 | 10/1998 | Lipo et al. | 310/181 |

FOREIGN PATENT DOCUMENTS

WO 90/02437   3/1990   WIPO.
WO 92/12567   7/1992   WIPO.
WO 96/38903   12/1996  WIPO.

Primary Examiner—Nestor Ramirez
Assistant Examiner—Tran Nguyen
Attorney, Agent, or Firm—Browdy and Neimark, P.L.L.C.

[57] ABSTRACT

A self-starting brushless electric motor comprises a first motor part (stator) (11) and a second motor part (rotor) (16), each motor part having plurality of pole units (12U, 12V) arranged in a pole row. The motor parts are supported for relative movement with the pole rows confronting one another across an air gap. The poles of each row include first-type poles (13, 19) and/or second-type poles (14), each row having at least one pole type, either a reluctance pole or a permanent-magnet pole magnetized transversely across the air gap, which is included in all pole units of the row. At least one of the pole rows includes such a second-type pole. At least one pole unit of at least one of the pole rows includes a pole which is magnetically asymmetric to establish a preferential direction of rotation of the motor parts (11, 16). A polyphase winding system comprises first-phase and second-phase winding coils (15U, 15V) disposed around the pole units (12A, 12V) of the first motor part (11). The common-type poles (13, 14) of the pole units on the first motor part are spaced-apart such that whenever a common-type pole associated with a first-phase winding coil (15U) is in an attracted (magnetically aligned) position with respect to a common-type pole (19) on the second motor part (16) when the winding coil is energized, all common-type poles associated with a second-phase winding coil (15V) are in a non-attracted position with respect to all common-type poles of the second motor part.

13 Claims, 5 Drawing Sheets

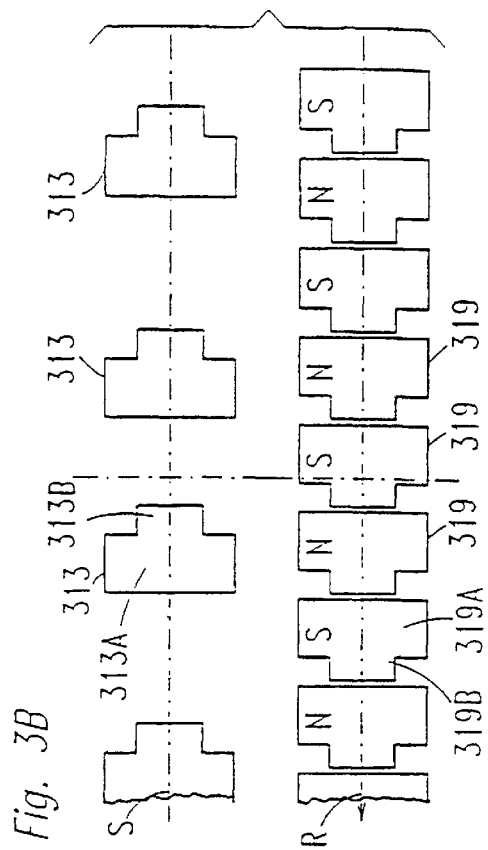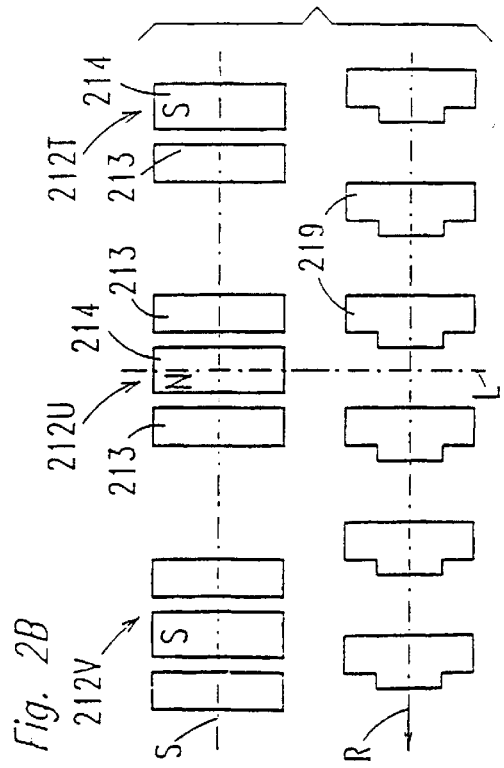

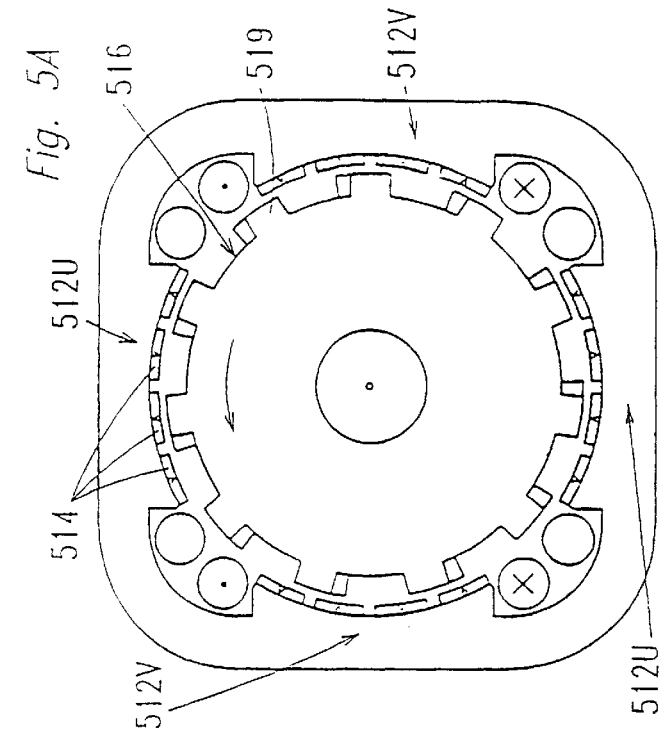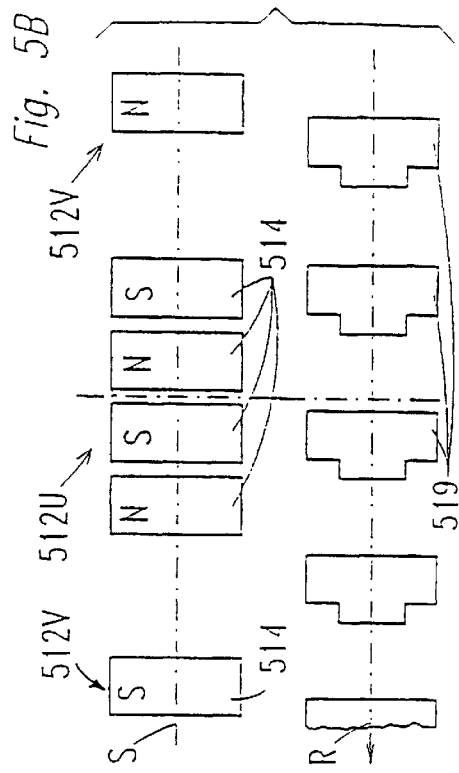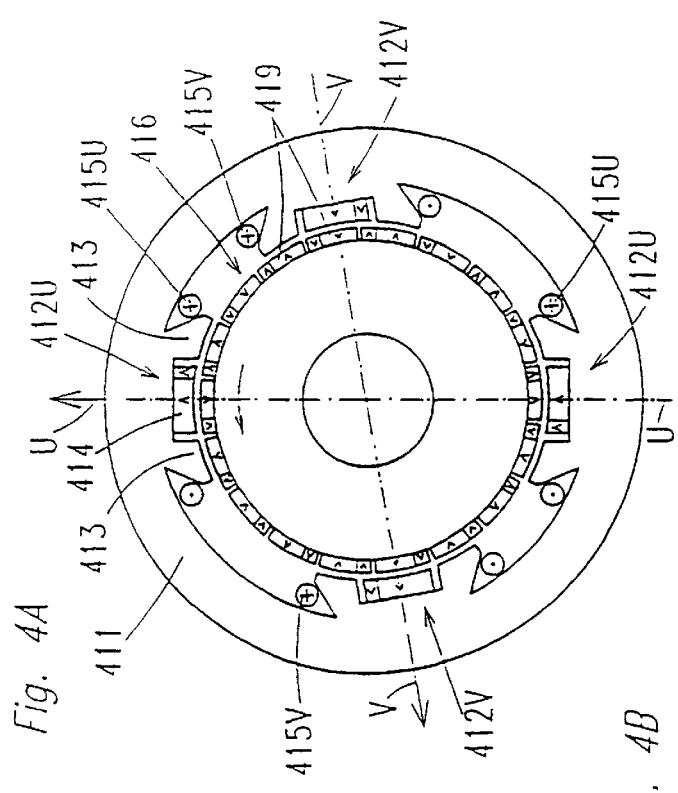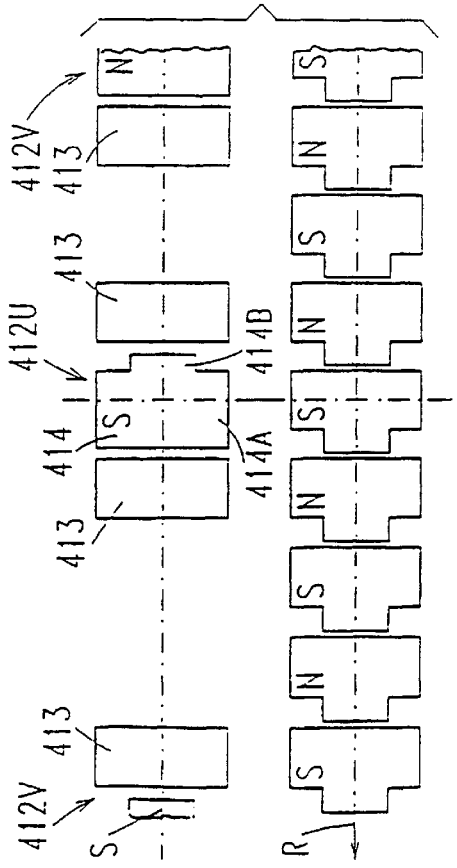

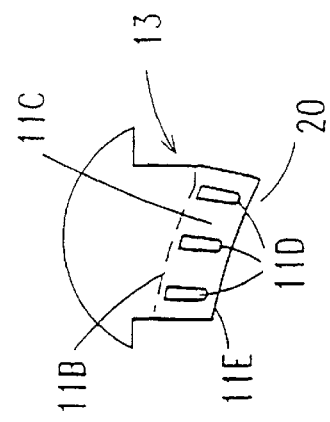
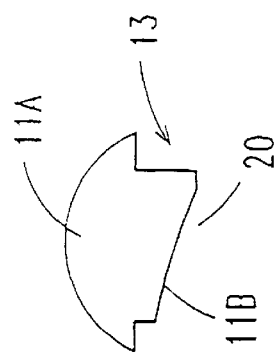
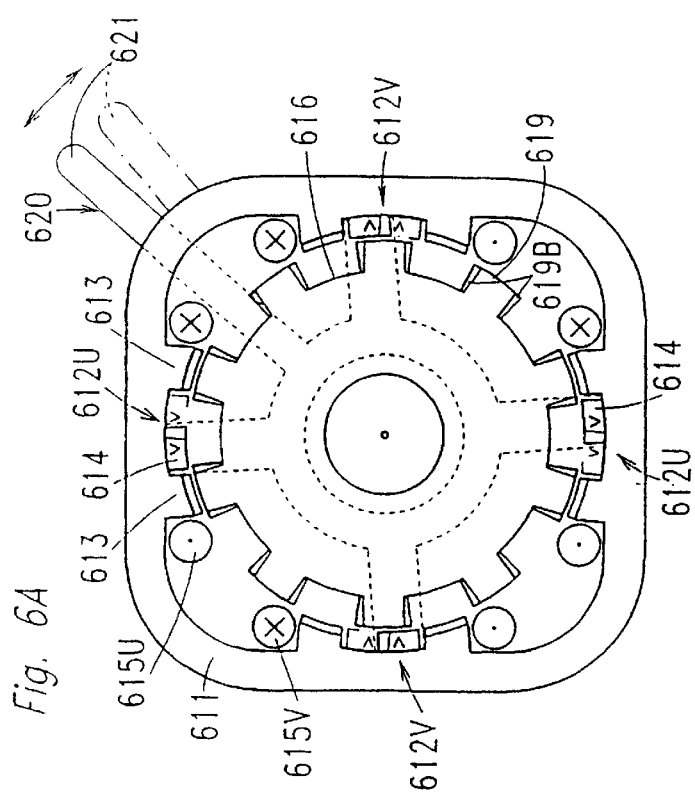
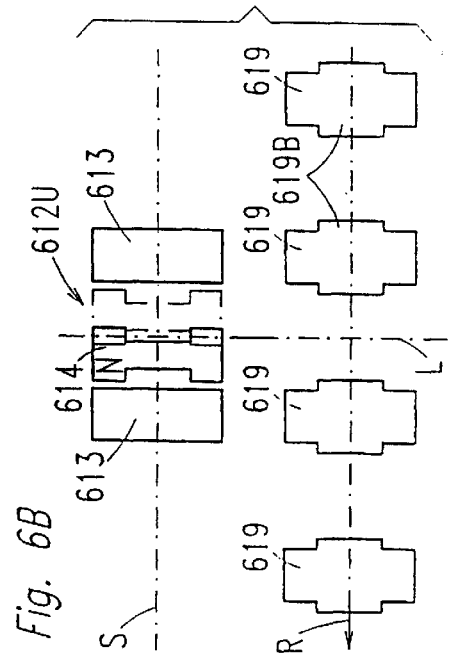

SELF-STARTING BRUSHLESS ELECTRIC MOTOR

This application is a 371 of PCT/SE97/00929, filed on May 29, 1997.

FIELD OF THE INVENTION

This invention relates to a self-starting brushless electric motor of the type which comprises reluctance poles (ferromagnetic salient poles) on at least one of the two relatively moving motor parts and one or more permanent magnets in the pole system.

REVIEW OF THE RELATED TECHNOLOGY

More particularly, the invention relates to a self-starting brushless electric motor comprising a first motor part having a plurality of pole units arranged in spaced-apart relation in a first pole row, a second motor part having a plurality of poles arranged in spaced-apart relation in a second pole row, bearing means supporting the first motor part and the second motor part for relative movement with the first pole row confronting the second pole row across an air gap, the first and second pole rows constituting a pole system comprising first and second pole types, the poles of the first pole type being reluctance poles and the poles of the second pole type being permanent-magnet poles which are polarized transversely to the air gap, and a winding system on the first motor part comprising a winding coil arranged in association with each pole unit to produce a magnetic field linking poles of the first and the second pole rows through the pole unit upon energization of the coil, at least one of the first and second pole rows exhibiting a magnetic asymmetry providing a preferential relative direction of movement of the motor parts upon energization of the winding system.

Electric motors of this kind are described in WO90/02437 and WO92/12567. They are characterized by, among other things, a unidirectional relative movement of the motor parts (stator and rotor) resulting from a magnetic asymmetry of the poles, and a torque which is high in relation to the motor size.

In an exemplary embodiment shown in WO92/12567, the first motor part is a stator provided with a single-phase winding while the second motor part is a cylindrical rotor. The stator has a single pole row comprising four identical salient ferromagnetic poles, reluctance poles, which are uniformly spaced-apart circumferentially, and two diametrically opposed permanent-magnet poles.

The winding comprises two winding coils, each coil being disposed about a pole unit consisting of one permanent-magnet pole and two ferromagnetic poles, one on either side of the permanent-magnetic pole. Thus, the stator has two pole units which are diametrically opposed to one another and associated with respective coils.

On the rotor there is a single pole row comprising four identical salient ferromagnetic poles which are uniformly spaced-apart circumferentially. Each such pole has a main pole body and an auxiliary pole part which projects circumferentially from the main pole body and extends only over a portion of the axial width of the main pole body. Accordingly, on the rotor there are four pole units, each consisting of a single pole which is magnetically asymmetric in the circumferential direction. In conjunction with the permanent-magnet poles the unidirectional magnetic asymmetry provides for self-starting of the motor in a single, given direction of rotation, so that it is not possible to reverse the starting direction of rotation by reversing the current supplied to the winding.

In operation of the motor the winding is alternately energized and deenergized. In the energized periods of the winding, the stator poles, by virtue of the magnetic attraction they exert on the rotor poles, turn the rotor a fraction of a full revolution to a position, hereinafter referred to as the indrawn or attracted position, in which the rotor poles are magnetically aligned with the main pole body of respective magnetized ferromagnetic poles of the stator.

When the winding is deenergized, the attraction exerted on the rotor poles by the ferromagnetic stator poles disappears, allowing the permanent magnets, by virtue of the attraction they exert on the adjacent auxiliary pole parts, to turn the rotor another fraction of a full revolution to a position in which the ferromagnetic rotor poles are angularly offset from the indrawn or attracted position. During the next energized period of the winding, the reluctance poles of the stator will again turn the rotor a further fraction of a full revolution from this offset position, which may be referred to as the start position, to a new indrawn or attracted position.

In other embodiments of the known motor, the pole units of the stator and/or the rotor are different from the pole units of the above-described embodiment. For example, in an alternative embodiment disclosed in WO92/12567, the pole row of the rotor comprises a large number of permanent-magnet poles of alternating polarities and polarized transversely to the air gap, each permanent-magnet pole constituting a pole unit. In these and other embodiments of the known motor all pole units of the stator have one pole type, e.g. a reluctance pole or a permanent-magnet pole, in common. That applies to the pole units of the rotor as well.

SUMMARY OF THE INVENTION

The present invention has for its general object to provide improvements in electric motors of the above-described type. A more specific object is to provide an electric motor of the above-described type which provides a more uniform torque than the prior art motors and is thus capable of running smoothly at low speeds and driving loads which require a high starting torque.

This and other specific objects, which will become evident from the following description, are achieved by constructing the motor as set forth in the claims.

For convenience, the description of the invention which follows is limited to rotary machines in which the motor part which carries the winding system is stationary and designated as the stator, while the other motor part is designated as the rotor and mounted for rotation within the stator. The poles of the stator and those of the rotor are arranged in annular, concentric pole rows and separated by a cylindrical air gap. As is readily understood, however, the relative movement of the motor parts need not be a rotational movement, but may be a linear or curvilinear relative movement. A combined rotational and linear relative movement is also within the scope of the invention. Moreover, the motor part which carries the winding, i.e. the stator, may be positioned inside the other part, the rotor, and the air gap need not be cylindrical but may be arcuate in cross-section or conical, for example.

To facilitate the understanding of the description, some of the concepts and terms which are used herein will be explained and discussed in general terms before a more detailed description of exemplary embodiments is given.

The motor according to the invention comprises reluctance poles on the stator or the rotor or both. The term reluctance pole as used herein is synonymous with the term ferromagnetic salient pole.

Reluctance poles provided on the stator may or may not be provided in association with transversely magnetized permanent-magnet poles, i.e. permanent magnets in which the magnetic field lines are substantially transverse to the air gap.

Moreover, the motor according to the invention comprises transversely magnetized permanent-magnet poles on the stator or the rotor or both. In some of the preferred embodiments, the stator is provided with both permanent-magnet poles and reluctance poles, whereas the rotor has either only permanent-magnet poles or only reluctance poles. It should be noted, however, that embodiments in which the rotor is also provided with both reluctance poles and permanent-magnet poles are also within the scope of the invention.

Each pole on the stator forms part of what is herein termed a pole unit or pole group. The stator comprises a plurality of spaced-apart pole units, each of which may comprise a single pole or a plurality of similar or dissimilar poles. However, regardless of the constitution or composition of the pole units, one given type of pole, a reluctance pole or a permanent-magnet pole, is common to all pole units on the stator.

Each pole unit on the stator is associated with a separate coil of one of the phase windings of a polyphase winding system. Each coil surrounds or is otherwise operatively coupled to its associated pole unit such that a magnetic flux magnetically linking the stator and the rotor across the air gap is produced in the pole or poles of the pole unit when the winding is energized. If the pole unit includes a permanent-magnet pole, this electromagnetic flux may oppose or add to the permanent-magnetic flux, depending on the directions of the fluxes.

Different coils, or different groups of coils, forming part of the same phase winding may be interconnected electrically and form a single circuit. Alternatively, coils forming part of the same phase winding may be energized by different but synchronized electronic power supply modules. A coil energized with current of alternating polarities may always be replaced with a split coil the coil sections of which are energized with unipolar current impulses but have magnetically opposite orientations.

The operation of each pole unit may be regarded as comprising operating cycles which are repeated a given number of times for each revolution of the rotor. When the rotor rotates very slowly, such as during starting-up from idle position, the operating cycle of a pole unit comprises a portion in which the associated coil carries current and a portion in which the coil is currentless.

As is also well known per se in the prior art motors, the pole rows of the motor according to the invention exhibit a magnetic asymmetry within at least one and preferably more of the pole units of one or both of the stator and the rotor.

In conjunction with the action of the permanent-magnet pole or poles, this asymmetry provides for unidirectional self-starting of the motor according to the invention even when only one of the winding phases is energized.

A further advantage gained by the pole unit asymmetry is that it extends the rotor angle interval within which a positive torque is exerted on the rotor by a permanent-magnet pole or by an energized phase winding, thereby giving rise to or extending overlap intervals between torque curves of different phases, resulting in a decidedly smoother torque development than for a comparable motor without pole unit asymmetries (i.e. a motor which is not necessarily self-starting).

The magnetic asymmetry can be achieved in several ways within the scope of the invention and the appended claims and some of them will be explained below.

As in the prior art motors, the magnetic asymmetry aims at building the preferential starting direction into the motor, but the magnetic asymmetry in motors according to the present invention also serves other purposes.

Basically, an additional purpose of the magnetic asymmetry as utilized in the present invention is to extend what is herein termed the pull-in distance. This is the distance over which a pole, a permanent-magnet pole or a magnetized reluctance pole, on one of the motor parts is capable of attracting a pole on the other motor part sufficiently to cause the two poles to be pulled towards one another from a first stable position, such as the indrawn position, to the next stable position, such as the starting position, in which they are mutually aligned magnetically and, accordingly, no magnetic pull force in the direction of relative movement exists between the poles (only a magnetic pull in a direction transverse to that direction).

During this pull-in motion the permeance between the two poles or, in other words, the magnetic flux passing between them (assuming that the magnetomotive force is constant) should increase steadily to a maximum value occurring when the poles are magnetically aligned. An extension of the pull-in distance thus calls for a lowering of the mean value of the rate of flux change over the pull-in distance.

Such a lowering can be accomplished by means of magnetic asymmetry, e.g. by providing on at least one of the poles an additional pole part extending in the relative preferential starting direction so that the pole will have a main pole part and an auxiliary pole part which determines the preferential starting direction.

In the starting position and the indrawn position, the auxiliary pole part extends at least to a point in the vicinity of the next pole (as seen in the relative preferential starting direction) on the other motor part and it may even slightly overlap that pole. However, an overlapping portion of the auxiliary pole part must not carry as much flux per unit length of overlap (measured circumferentially) as overlapping portions of main pole parts.

Assuming that in a rotary motor chosen by way of example both the leading ends and the trailing ends of both the stator poles and the rotor poles extend axially, magnetic asymmetry of a stator pole could in most cases in principle be observed in the following way. The rotor of the motor is replaced with a homogenous ferromagnetic cylinder of the same diameter as the rotor and the flux density in the air gap is measured along an axially extending line on the cylinder surface as the cylinder is rotated to move the line in the preferential direction of rotation past the pole. A graph showing the measured flux density (as averaged over the length of the line) versus the angular position of the line relative to the pole would rise, more or less steadily or in more or less distinct steps, from a point near zero at the leading end of the pole, to a roughly constant value under the main portion of the pole and then decline steeply at the trailing end. If the pole were magnetically symmetric instead, the graph would be symmetrical and resemble a Gaussian curve.

With suitable modifications the above-described principle is applicable also in other cases, such as when observing magnetic asymmetry of a rotor pole or a pole whose leading and trailing ends do not extend axially. For example, where the ends of the pole are skewed so that they extend along a helical line, the observation can be made with the measurement of the flux density taking place along a correspondingly skewed line.

In the case of permanent-magnet poles with uniform radial dimension and uniform magnetic polarization radially or transversely to the air gap, magnetic pole asymmetry can result from the pole shape. For example, the leading and trailing ends of the pole may have different lengths in the axial direction of the motor. A similar effect can also be achieved by magnetically imprinting poles with a corresponding shape in a ring of permanent-magnetic material of uniform thickness. In this case the shape of the permanent-magnet ring has nothing to do with the magnetic pattern or "magnetic shape".

Magnetic pole asymmetry can also be achieved by providing a permanent-magnet pole with different radial dimensions at the leading and trailing ends, respectively, (i.e. by giving the air gap at the pole a width that varies in the direction of the relative movement of the motor parts) but giving it a uniformly strong magnetization over its entire volume.

Several methods can of course be used simultaneously in order to achieve magnetic asymmetry for the permanent-magnet poles.

There are also several ways of achieving magnetic asymmetry for salient ferromagnetic poles, the reluctance poles. One method is to arrange the surface of such a pole facing the air gap asymmetrically with regard to its dimension (width) in the axial direction of the motor, in which case the entire pole surface may be situated at the same radial distance from the axis of rotation.

Another method is to make the projection surface of the reluctance pole (the surface facing the air gap) symmetrical, but vary its radial distance from the axis of rotation, i.e. vary the width of the air gap along the pole surface, stepwise or continuously, in relation to an imagined (cylindrical) surface on the other motor part.

A third method is to vary the magnetic saturation flux density along the pole surface. This can be achieved by using different magnetic materials for different parts of the salient pole, or it can be achieved by varying the filling factor of the laminated ferromagnetic poles, or by means of punched recesses, for example, below the actual pole surface (so that the actual pole surface appears to be homogenous), or by varying the radial dimension of an auxiliary pole part such that it will have a shape resembling the profile of the curved beak of a bird when viewed in the direction of the axis of rotation.

Of course several methods of achieving magnetic asymmetry can be used simultaneously. The choice of how to achieve asymmetry is usually dependent on a balance between the manufacturing costs of the motor and the cost of the supply electronics, since the choice of the type of asymmetry may affect the size of the power electronic switch elements included in the supply electronics.

As will become apparent, in motors embodying the invention magnetic asymmetry may characterize not only an individual pole of a pole unit which is associated with a common winding coil such that all poles of the pole unit are subjected to the magnetic field produced upon energization of the coil. It may also characterize the pole unit and then not only by virtue of magnetic asymmetry of one or more individual poles but also by virtue of an asymmetrical positioning of an individual pole within a pole unit on the stator or on the rotor.

A pole of a pole unit on the stator is asymmetrically positioned if a rotor pole is moved through a distance longer or shorter than one-half rotor pole pitch when it is moved between a position in which it is magnetically aligned with that stator pole and the next adjacent position in which any pole on the rotor is magnetically aligned with a stator pole of a different pole type or, in the case of a stator having only permanent magnets, a pole of different polarity.

In other words, a permanent-magnet pole, for example, on the stator is asymmetrically positioned with respect to a reluctance pole in the same or a different pole unit if a rotor pole traverses a distance which is longer or shorter than one-half rotor pole pitch when the rotor moves between a position in which a rotor pole is magnetically aligned with that permanent-magnet pole, i.e. is in the starting position, to the next following or next preceding position in which a rotor pole—which may be any rotor pole—is in an indrawn position.

In a corresponding manner, magnetic asymmetry resulting from asymmetrical positioning of poles may also exist in the rotor. For example, in a pole row on a rotor comprising permanent-magnet poles of alternating polarity, the north-pole permanent-magnet poles may be displaced in either direction from a central position between the south-pole permanent-magnet poles with all like poles substantially equally spaced.

It should be noted in the context of the present invention that a pole unit (pole group) may comprise a single pole or a plurality of poles associated with a magnetizing coil.

BRIEF DESCRIPTION OF THE DRAWINGS

The invention will now be described in greater detail with reference to the accompanying drawings in which a number of exemplary embodiments are schematically illustrated.

FIGS. 2A and 2B are views corresponding to FIGS. 1A and 1B showing a motor according to a second embodiment of the invention;

FIGS. 3A and 3B are views corresponding to FIGS. 1A and 1B showing a motor according to a third embodiment of the invention;

FIGS. 4A and 4B are views corresponding to FIGS. 1A and 1B showing a motor according to a fourth embodiment of the invention;

FIGS. 5A and 5B are views corresponding to FIGS. 1A and 1B showing a motor according to a fifth embodiment of the invention;

FIGS. 6A and 6B are views corresponding to FIGS. 1A and 1B showing a motor according to a sixth embodiment of the invention;

FIGS. 7A and 7B are fragmentary views showing a modified form of the stator reluctance poles of the motor shown in FIGS. 1A–1D.

DETAILED DESCRIPTION OF THE PREFERRED EMBODIMENTS

Figure 1C:
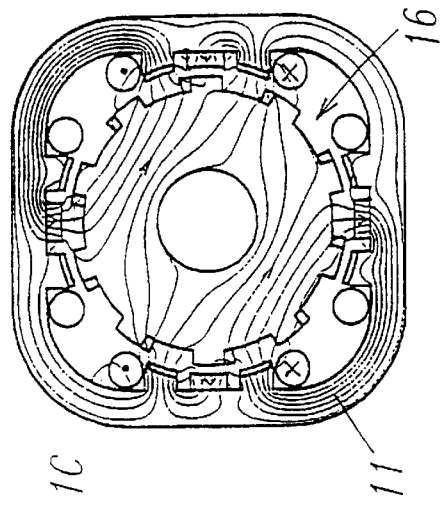
FIG. 1C is a cross-sectional view corresponding to FIG. 1A and showing the flux line pattern.

In all of the embodiments illustrated in the drawings the motor according to the invention is a rotary motor in which the first motor part, the motor part which is provided with the winding system, is a stator within which the second motor part, the rotor, is supported for rotation by bearings mounted on the stator or other stationary parts. As will readily be appreciated, the invention may also be embodied in rotary motors in which the first motor part is positioned inside the second motor part and in motors in which the relative motion of the first and second motor parts is linear or both rotary and linear (the poles of both the first and the second motor part then being disposed along helical pole rows). In the case of rotary motors the pole faces of the poles of the first and the second motor parts may be disposed on cylindrical or conical surfaces or, in the case of axial-flux motors, annular surfaces disposed in transverse planes. Moreover, the first motor part may extend only over a portion of the circumference of the second motor part, cf. FIG. 4 of WO92/12567.

Throughout the drawings, the polarity of the transversely, i.e. substantially radially magnetized permanent-magnet poles is indicated by an arrow-head pointing towards the north-pole side of the magnet.

Moreover, in all embodiments shown in the drawings, the asymmetry of the stator and/or the rotor poles is directed such that the preferential starting direction of the rotor is counterclockwise.

Referring to FIGS. 1A–1D, the ferromagnetic laminated stator 11 of the motor is provided with four identical pole units 12U, 12V which are uniformly spaced-apart along an annular pole row S (FIG. 1B) such that there are two diametrically opposite pole units 12U and two diametrically opposite pole units 12V. Each pole unit 12U, 12V comprises a pair of salient ferromagnetic poles, also called reluctance poles 13, which are spaced-apart along the pole row, and a permanent-magnet pole 14 which is positioned between the reluctance poles. The pole units 12U, 12V are geometrically symmetric both with respect to a circumferential centre line of the pole row S and with respect to a centre line L which is perpendicular to the centre line S and parallel to the axis C of rotation of the rotor, see FIG. 1B. The poles 13 and 14 are also magnetically symmetric in the above-mentioned sense.

A two-phase winding system on the stator comprises two alternately energized pairs of winding coils 15U and 15V. The winding coils 15U of one pair are disposed around the pole units 12U and form part of a first-phase winding. Similarly, the winding coils 15V of the other pair are disposed around the pole units 12V and form part of a second-phase winding. The two phases of the winding system are supplied with pulsating direct currents in phase opposition.

Figure 1D:
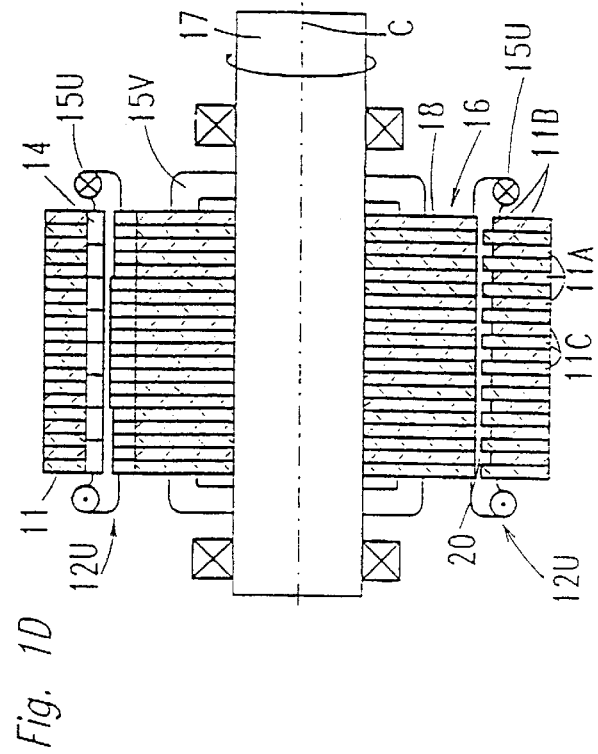
FIG. 1D is a simplified axial sectional view of the motor along line 1D—1D in FIG. 1.

The ferromagnetic laminated rotor 16 comprises a rotor shaft 17 and a ferromagnetic rotor body 18. Ten identical pole units, each consisting of a single ferromagnetic salient pole, termed reluctance pole 19, are uniformly spaced-apart along an annular pole row R (FIG. 1B). The pole row R of the rotor 16 is positioned in the same transverse plane as the pole row S of the stator 11 so that during rotation of the rotor 16 each rotor pole 19 will successively become aligned with and confront all poles 13, 14 on the stator 11.

Each reluctance pole 19 comprises a main pole body or part 19A of approximately the same axial dimension as the poles 13, 14 of the stator, and an auxiliary pole part or nose 19B of a lesser axial dimension as shown in FIG. 1B in which straightened sections of the stator pole row S and the rotor pole row R (both pole rows viewed from within the air gap) are shown axially spaced-apart for clearness of illustration.

Figure 1A:
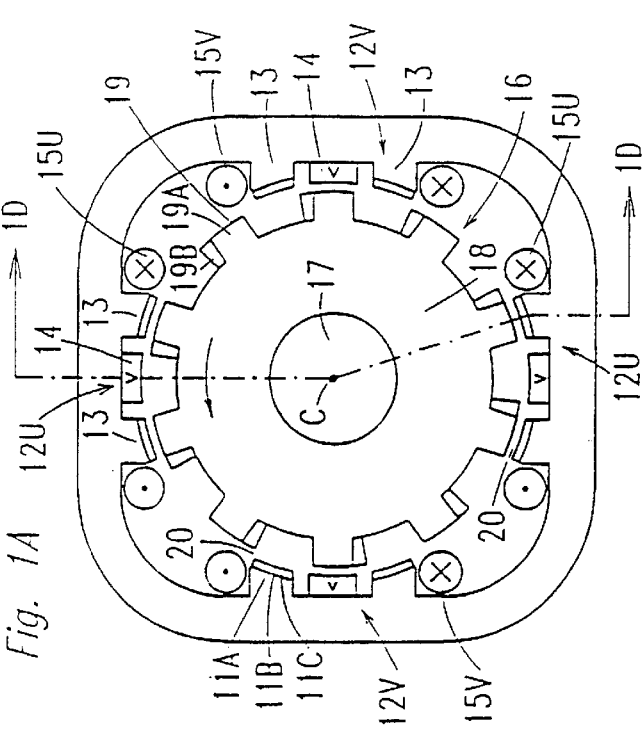
FIG. 1A is a cross-sectional view showing a motor according to a first embodiment of the invention.
Figure 1B:
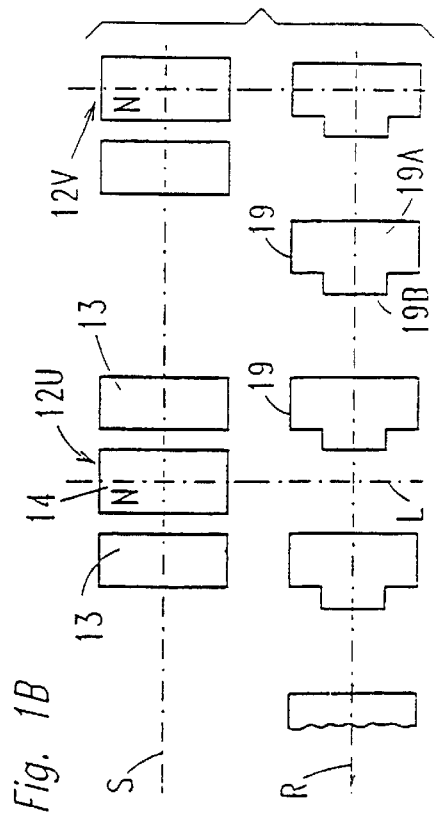
FIG. 1B is a developed view which schematically shows the relative positions of the poles of the stator and the poles of the rotor, all poles being viewed from within the air gap between the stator and the rotor.

The auxiliary pole parts 19B, which project from the counterclockwise side of their respective main pole parts 19A as seen in FIG. 1A, render the poles 19 magnetically asymmetric in the above-defined sense so that the motor will have a preferential starting direction and will accordingly start running in the counterclockwise direction.

The pole faces of the rotor poles 19 are contained in a common imaginary cylindrical surface the axis of which coincides with the axis C of rotation of the rotor 16. Similarly, the pole faces of the stator poles 13, 14 are contained in a common imaginary cylindrical surface which is concentric with and slightly spaced from the first-mentioned cylindrical surface so that a narrow cylindrical air gap 20 separates the rotor poles 19 from the stator poles 13, 14.

As is shown in FIG. 1A, the angular spacing of the reluctance poles 13 of each pole unit 12U, 12V of the stator 11 is the same as the angular spacing of neighbouring poles 19 of the rotor 16. As the number of rotor poles 19 is ten, the angular spacing or pitch of neighbouring rotor poles and, accordingly, the angular spacing of the reluctance poles 13 of each stator pole unit 12U, 12V is 36 degrees. The spacing of poles (of any type) 13 and/or 14 within the pole units is thus half of that, or 18 degrees. The angular spacing of the pole units is 90 degrees, which is not divisible by 18 degrees. Therefore, the angular spacing of the pole units is not any multiple of an angular spacing of the poles in the first pole row.

Moreover, as the angular spacing of the pole units 12U, 12V of the stator 11 is 90 degrees, only four rotor poles 19 at a time can be magnetically aligned with reluctance poles 13 as shown at the upper and lower stator pole units 12U in FIGS. 1A–1C. For convenience, this relative position of the rotor poles 19 and the reluctance poles 13 of the stator is herein termed "attracted position", because when the winding coils 15U associated with the stator pole units 12U are energized by the operating current of the motor, the rotor poles will be strongly attracted towards this position by the reluctance poles 13 of the stator, namely by the tangential (i.e. the torque-producing) component of the magnetic force acting between the rotor poles and the reluctance poles of the stator pole units 12U. Accordingly, the "attracted position" represents a stable equilibrium of the rotor, around which a realigning magnetic torque would arise if the rotor were to be deflected from that position while the winding coils 12U carry the operating current. Whereas the tangential magnetic force is nil in the "attracted position", the radial component of the magnetic force reaches its maximum. In other words, the attracted position is a position of minimum reluctance of a rotor pole relative to a magnetized stator pole.

Except for these four rotor poles 19, all other rotor poles 19 will be angularly offset from the reluctance poles 13 of the stator in the relative position shown in FIGS. 1A–1C. This offset position will be termed a "non-attracted position" because in this position the magnetized reluctance poles of the stator can exert a net tangential force on these rotor poles in the preferential direction so as to draw them to the attracted position.

However, in the relative position shown in FIG. 1A, two of those rotor poles 19 which are in a non-attracted position with respect to the reluctance poles 13 of the stator pole units 12V are magnetically aligned with the permanent-magnet poles 14 of these stator pole units 12V. These two rotor poles will be attracted by the permanent-magnet poles, which thus tend to retain them in the aligned position as long as the winding coils 15V are currentless so that the associated reluctance poles 13 will not be magnetized.

The situation illustrated in FIG. 1A is a stable or indrawn position which exists when the first-phase winding coils 15U are energized and the second-phase winding coils 15V are deenergized and thus do not carry a current.

If in this relative position of the stator and the rotor the first-phase winding coils 15U are deenergized and instead the second-phase winding coils 15V are energized, each permanent-magnet pole 14 of the upper and lower stator pole units 12U will exert a stronger attraction on the neighbouring rotor pole 19 whose auxiliary pole 19B is directed towards the permanent-magnet pole, than on the other neighbouring rotor pole 19, whose auxiliary pole part 19B is directed away from the permanent-magnet pole. Consequently, the permanent-magnet poles 14 of the stator pole units 12U will apply a counterclockwise torque to the rotor 16.

FIG. 1C shows the same relative position as FIG. 1A and additionally shows the magnetic flux pattern which exists when the energization of the winding system has been shifted from the first-phase coils 15U to the second-phase coils 15V. The now magnetized reluctance poles 13 of the left and right stator pole units 12V will also apply a counterclockwise torque to the rotor 16, because each of these reluctance poles will attract the nearest auxiliary pole part 19B.

Under the action of this torque the rotor 16 will be turned counterclockwise through an angle corresponding to one-half rotor pole pitch, i.e. until four rotor poles 19 are again in an attracted position, this time with respect to the reluctance poles 13 of the right and left stator pole units 12V and all other rotor poles are in a non-attracted position with respect to the stator reluctance poles.

When the current supply to the winding system of the stator 11 is switched off, the permanent-magnet poles 14 of either the upper and lower (first-phase) stator pole units 12U or the left and right (second-phase) stator pole units 12V will tend to stop and hold the rotor 16 in the last-mentioned position or in the position shown in FIG. 1A ("parking" or detent positions) in which a pair of diametrically opposite rotor poles 19 are in an attracted, stable position with respect to a pair of diametrically opposite permanent-magnet poles 14. Naturally, friction or other external forces which act on the rotor and prevail over the magnetic attraction between the stator and the rotor may cause the rotor to stop and remain in an undefined, unstable position. However, regardless of the stop position of the rotor, starting in the preferred direction will be possible when the winding system is again energized.

Figure 1E:
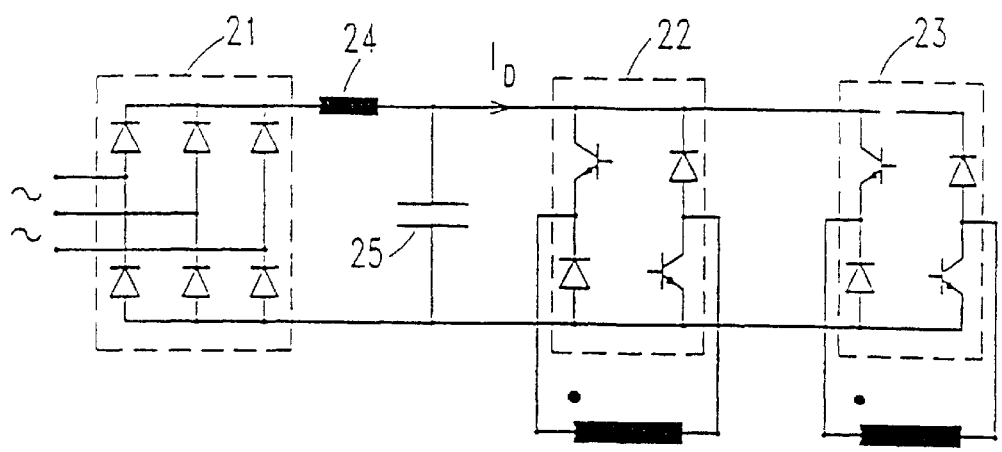
FIG. 1E is a circuit diagram of an electronic power supply for the motor shown in FIG. 1.

FIG. 1E shows an example of a drive circuit for supplying power from a three-phase mains to the motor of FIGS. 1A–1D and other two-phase motors according to the invention fed by pulsating direct current. It comprises a rectifier bridge 21 which is connected to a pair of semiconductor switching bridge circuits 22 and 23 through a smoothing inductor 24 and a so-called DC-link capacitor 25. The switching bridge circuits are controlled by a control device (not shown) so as alternately to feed the phase winding coils 15U and 15V.

Figure 1F:
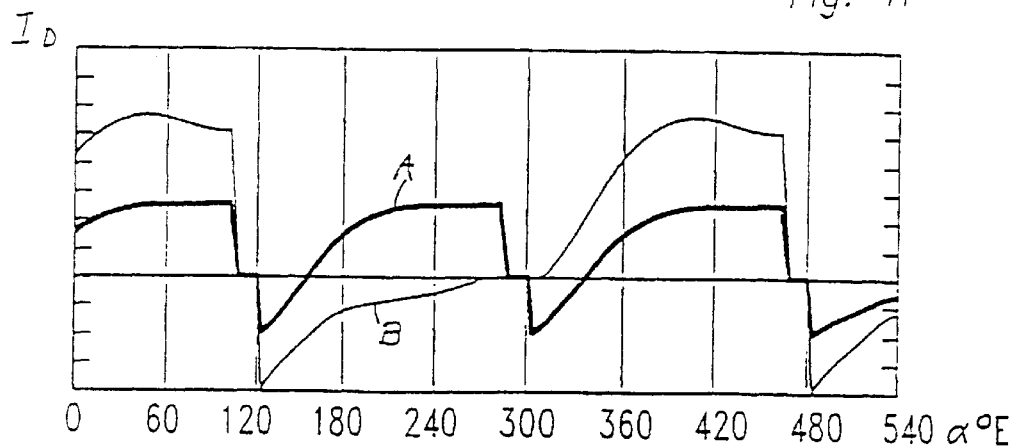
FIGS. 1F–1G show characteristic curves for the motor of FIG. 1 and a corresponding prior art motor.

In the diagram of FIG. 1F the heavy line A represents the DC-link load current ($I_D$), versus the angular rotor position ($\alpha$) in electrical degrees (° E) for the motor according to FIGS. 1A–1D, while the thin line B represents the DC-link load current for a comparable prior art motor according to WO92/12567 with a single-phase winding system. It is immediately apparent from the diagram that the pulsations of the DC-link load current of the motor according to FIGS. 1A–1D are considerably reduced in comparison with the pulsations of the prior art motor and also that they occur at twice as high a repetition frequency. This means that the fluctuations of the DC-link load current of the motor according to FIGS. 1A–1D are less harmful to the mains or are easier to reduce to a prescribed level.

It is true that the reduction of the harmful influence on the mains which is achieved with the motor according to FIGS. 1A–1D has been made possible only by using two semiconductor switching bridges instead of the single switching bridge required by the prior art motor. In most cases, however, this entails no major disadvantage and in fact may sometimes be an advantage, because it may be cheaper to provide two switching bridges for a motor according to FIGS. 1A–1D than to provide a single switching bridge for a prior art motor, given that the output power of both motors is the same. In the first-mentioned case the semiconductor components may be of a lower power rating than in the second case. Actually, there may even be a cost advantage in providing a separate switching bridge for each winding coil.

Figure 1G:
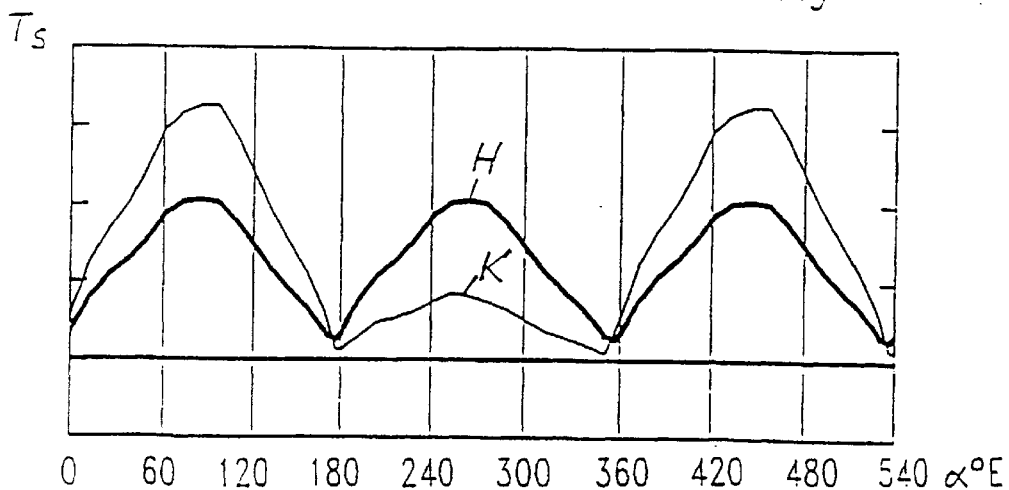

In the diagram of FIG. 1G, the heavy line H represents the starting torque ($T_S$) versus the angular rotor position ($\alpha$) in electrical degrees for the motor according to FIGS. 1A–1D, while the thin line K is the corresponding torque curve for a comparable motor according to WO92/12567 (the mean torque being the same for both motors). These curves are also roughly indicative of the differences between the two motors in respect of the starting torque versus the angular rotor position.

It is thus apparent that the motor according to the invention, as represented by the motor shown in FIGS. 1A–1D, develops a much smoother air-gap torque at operating speeds than does the prior art motor. Moreover, the lowest available air-gap torque, i.e. the starting torque at the most unfavourable rotor positions, is considerably higher in the motor shown in FIGS. 1A–1D.

The motor shown in FIGS. 2A and 2B essentially differs from that shown in FIGS. 1A–1D only in that the stator 211 is provided with three pairs of identical and uniformly spaced-apart pole units 212T, 212U and 212V, each surrounded by a winding coil 215T, 215U and 215V of a three-phase winding system. The rotor 216 is provided with fourteen pole units, each consisting of a magnetically asymmetric reluctance pole 219. The pole units of both the stator and the rotor closely resemble those of the motor shown in FIGS. 1A–1D.

In the relative position of the stator 211 and the rotor 216 shown in FIGS. 2A and 2B, four of the rotor poles 219 are in the indrawn, attracted position with respect to the reluctance poles 213 of each of the stator pole units 212U, the winding coils 215U of which are energized, while all other rotor poles 219 are circumferentially offset from the reluctance poles 213 of the stator pole units 212T and 212V and thus are in non-attracted positions with respect to these reluctance poles.

Each time the winding coil energization is switched off from, say, the paired windings coils 215U, the paired winding coils 215V are already energized. The rotor 216 is acted on by both the stator pole units 212V and the permanent-magnet poles of the two other pairs of pole units, whose winding coils are currentless, such that the rotor is turned counterclockwise. After a rotor movement corresponding to one-third of the rotor pole pitch, four new rotor poles will reach an attracted position opposite to the reluctance poles of the paired stator pole units 212V.

In the motor shown in FIGS. 3A and 3B the stator 311 is provided with two pairs of identical and uniformly spaced-apart pole units 312U and 312V as in FIGS. 1A–1D, each surrounded by a winding coil 315U, 315V of a two-phase winding system.

Unlike the stator pole units of the motor of FIGS. 1A–1D, however, each stator pole unit 312U or 312V consists only of a pair of reluctance poles 313, namely reluctance poles which are magnetically asymmetric in that each of them comprises a main pole part 313A and an auxiliary pole part 313B which projects from the clockwise side of the main pole part, i.e. the direction opposite to the starting direction of rotation of the rotor 316.

Also unlike the rotor pole units of the motor of FIGS. 1A–1D, each of the eighteen rotor pole units of the rotor 316 consists of a permanent-magnet pole 319 which is magnetically asymmetric in that it comprises a main pole part 319A and an auxiliary pole part 319B which projects from the counterclockwise side of the main pole part, i.e. in the direction of rotation of the rotor. Neighbouring permanent-magnet poles 319 are of opposite polarities and their angular spacing or pitch is one-half of the angular spacing of the reluctance poles 313.

Another dissimilarity of the motor shown in FIGS. 3A, 3B compared with the motor of FIGS. 1A–1D is that the winding coils 315U, 315V are supplied with current pulses of alternating polarities so that the direction of magnetization of each reluctance pole 313 alternates. In the motor of FIGS. 3A, 3B, the permanent-magnet poles 319 of the rotor 316 also accomplish the holding of the rotor in the start position, i.e. they also accomplish the function of the permanent-magnet poles of the stator pole units of the motor shown in FIGS. 1A–1D. Moreover, the asymmetry of the reluctance poles of the stator in FIGS. 3A, 3B adds to the effect produced by the asymmetry of the rotor poles.

In the motor shown in FIGS. 4A and 4B the rotor 416 is similar to the rotor 316 shown in FIGS. 3A, 3B and accordingly comprises an annular row of eighteen magnetically asymmetric, uniformly spaced-apart permanent-magnet poles 319 of alternating polarities. The stator 411 likewise comprises four identical pole units 412U and 412V with associated winding coils 415U and 415V of a two-phase winding system the winding coils of which are supplied with pulsating direct current as in the motor of FIGS. 1A–1D.

Unlike the stator pole units shown in FIGS. 3A, 3B, however, the stator pole units 412U and 412V comprise both reluctance poles and permanent-magnet poles. More specifically, each stator pole unit 412U, 412V comprises a pair of spaced-apart symmetric reluctance poles 413 (the angular separation of which is twice the angular separation or pitch of the rotor poles) and an asymmetric permanent-magnet pole 414 which is positioned centrally between the reluctance poles and comprises a main pole part 414A and an auxiliary pole part 414B projecting from the clockwise side of the main pole part. The permanent-magnet poles 414 of diametrically opposite stator pole units are of opposite polarities.

Also unlike the stator pole units shown in FIGS. 3A, 3B, the stator pole units 412U and 412V are not uniformly spaced-apart. The two pole units 412U with associated winding coils 415U belonging to the first phase of the winding system are centered on a diameter U and the two pole units 412V with associated winding coils 415V belonging to the second phase of the winding system are similarly centered on a diameter V. As is seen in FIG. 4A, the diameters U and V are not orthogonal. The angular spacing of each stator pole unit 412U, 412V from its two neighbouring stator pole units corresponds to four rotor pole pitches (eighty degrees) on one side and five pole pitches (one hundred degrees) on the other side.

In the relative position of the stator 411 and the rotor 416 shown in FIGS. 4A, 4B, the four permanent-magnet poles 419 of the rotor 416 which are positioned opposite the reluctance poles 413 of the first-phase pole units 412U, are in an attracted position relative to the these reluctance poles. At the same time, the two permanent-magnet poles 419 of the rotor 416, which are positioned opposite the permanent magnet poles 414 of the second-phase pole units 412V, are in an attracted position relative to these permanent-magnet poles on the stator. Accordingly, the illustrated rotor position is a starting position, from which the motor will start upon energization of the second-phase winding.

In the motor shown in FIGS. 5A and 5B, the rotor 516 is of the same type as in FIGS. 1A–1D and accordingly comprises an annular row of magnetically asymmetric reluctance poles 519. In this case the number of reluctance poles is eleven.

As in FIGS. 1A–1D, the stator 511 in FIGS. 5A, 5B comprises four identical, uniformly spaced-apart pole units 512U and 512V with associated winding coils 515U and 515V of a two-phase winding system. However, in this case the stator pole units only comprise permanent-magnet poles 514; each stator pole unit 512U, 512V comprises a row of four symmetric permanent-magnet poles 514 of alternating polarities, the pole pitch being one-half of the pitch of the rotor poles 519. Moreover, the phases of the winding system are supplied with currents of alternating polarities as in the motor of FIGS. 3A, 3B.

FIGS. 6A and 6B show a motor which exhibits magnetic asymmetry in its pole rows, although all individual poles, both those on the stator and those on the rotor, are magnetically symmetrical. In this motor the object of the invention is instead achieved by magnetic asymmetry within the pole units on the stator, namely by asymmetrical positioning of a symmetrical permanent-magnet pole between a pair of symmetrical reluctance poles of the pole units.

More particularly, the motor shown in FIGS. 6A, 6B comprises a stator 611 having reluctance poles 613 similar to those shown in FIGS. 1A to 1D. The rotor 616 also resembles the rotor in FIGS. 1A to 1D, except that its poles 619 are provided with auxiliary pole parts 619B both at the leading end and at the trailing end and these auxiliary pole parts are of lesser circumferential dimension.

Each pole unit 612U, 612V comprises a rectangular magnetically symmetrical permanent-magnet pole 614 which is placed in an asymmetric or off-centre position adjacent to one of the two reluctance poles 613. The permanent-magnet poles 614 of the pole units 612U, 612V are connected to a common actuating mechanism 620 including a lever 621.

In operation of the motor the permanent-magnet poles 614 are stationary in the selected off-centre position, but by shifting the lever 621 downwards from the position shown in full lines in FIG. 6A, the permanent-magnet poles 614 of the pole units 612U and 612V can be moved circumferentially from the illustrated off-centre position to a corresponding off-centre position (indicated in dash-dot lines in FIGS. 6A, 6B) adjacent to the other stator reluctance poles 613 to reverse the preferential direction of rotation of the rotor.

The rotor 616 is shown with its poles 619 in the indrawn or attracted position relative to the reluctance poles 613 of the pole units 612U. In this position the auxiliary pole parts 619B at the trailing end (assuming counterclockwise rotation of the rotor) of two of the rotor poles, the upper left pole and the lower right pole, are closely adjacent to one end of each permanent-magnet pole 614 and preferably there is a slight overlap between each permanent-magnet pole and the adjacent one of these rotor poles. The spacing of the opposite end of each permanent-magnet pole 614 and the other adjacent rotor pole is substantial.

Accordingly, in the illustrated indrawn rotor position, the magnetic attraction between each permanent-magnet pole 614 and the rotor pole 619 ahead of it, as seen in the direction of rotation of the rotor, will be heavily predominant over the magnetic attraction between the permanent-magnet pole and the rotor pole behind it. When the current in the winding coils 615 is switched off with the rotor in the illustrated position, the permanent-magnet poles 614 therefore will pull the rotor clockwise to the starting position.

In the starting position the auxiliary pole parts 619B on the leading end of the rotor poles 619 will be closely adjacent to, and preferably slightly overlap, the two stator reluctance poles 613 ahead of them. When the winding coils 15 are then again energized, these reluctance poles can therefore forcefully jerk the rotor in the counterclockwise direction away from the starting position as described above with reference to FIGS. 1A to 1D.

In all embodiments illustrated in the drawings, the stator and the rotor are laminated from thin electric steel plates as is indicated in FIG. 1D (where the thickness of the plates is heavily exaggerated for clearness of illustration).

In the portions of the plates which form the stator reluctance poles 13, every second stator plate 11A is slightly reduced such that the curved plate edges 11B facing the air gap are offset radially outwardly relative to the neighbouring plates, see FIG. 1A and the lower portion of FIG. 1D. In other words, only every second plate 11C extends up to the air gap while the intervening plates 11A end short of the air gap. A similar reluctance pole design is provided in the motor shown in FIGS. 2A–2B.

This thinning out of the plate stack at the pole face of the reluctance poles serves to ensure that the change of the flux in the air gap between the stator and rotor reluctance poles that takes place as the rotor reluctance poles move past the stator reluctance poles is proportional to the change of the pole overlap area. In other words, they serve to ensure that the flux density in the pole overlap area is substantially constant as long as the flux change is not limited by magnetic saturation in a different region of the magnetic circuit so that the torque developed by the interaction of the poles will be as uniform as possible.

Magnetically, the effect of the reduction or shortening of the reluctance pole portion of every second plate is a 50% lowering of the averaged value of the saturation flux density across the pole face serving the purpose of reducing the magnetic induction swing (the interval within which the flux density varies over an operating cycle of the motor) in the bulk of the laminated stack, where the predominant part of the iron losses arise.

FIGS. 7A and 7B show a modified technique for thinning out the reluctance poles at the pole faces. This modified technique, which is suitable for motors running at elevated operating frequencies, is not limited to the polyphase motors described above but is generally applicable to all motors having reluctance poles both on the stator and the rotor. For example, motors of the kinds disclosed in WO90/02437 and WO92/12567 can have reluctance poles of the stator and/or the rotor designed according to the modified technique.

Increased motor speeds require increased operating frequencies of the current supply for the motor. However, increased operating frequencies are accompanied by increased iron losses. One technique for avoiding the increase of the iron losses consists in using thinner plates for the laminations, but if the plate thickness is reduced it may be difficult or impossible to use automatic production equipment. Another technique consists in reducing or shortening two out of every three plates, but this technique is in most cases unsatisfactory.

It is an object of the present invention to provide a reluctance pole design which can be adapted for motors operating at elevated frequencies without it being necessary to resort to any of the above-described techniques.

In accordance with the invention, the desired reduction of the induction swing at increased operating frequencies is achieved in a reluctance pole of the type shown in FIGS. 1A–1D and 2A, 2B by providing recesses in those plates which extend up to the air gap, which recesses constrict the cross-sectional area of the plate presented to the magnetic flux in the pole and thereby contribute to a lowering of the flux density for which the pole becomes magnetically saturated at the pole face.

The recesses should be distributed substantially uniformly over the cross-section of the plate. They may take the form of holes, i.e. openings which are not open to the air gap, or they may take the form of openings which communicate with the air gap, preferably via narrow passages. Wide passages are undesirable because they give rise to eddy currents in the faces of the reluctance poles and also, at least with some permanent-magnet materials, the permanent-magnet poles of the other motor part.

In FIGS. 7A and 7B the modification is exemplified for the reluctance poles of the stator of the motor shown in FIGS. 1A–1D, namely the stator reluctance pole 13 to the right in the upper stator pole unit 12U. FIG. 7A shows the shortened reluctance pole portion (having the curved plate edge 11B) of one plate 11A while FIG. 7B shows the full-length reluctance pole portion of the neighbouring plate 11C. In the region near the air gap 20 this portion is provided with three recesses 11D in the form of elongate openings which have a closed contour and thus are not connected with the curved edge 11E facing the air gap. The three recesses are uniformly distributed along the length of the curved edge.

When designing the recessed portion of the plates, the following empirical equation $$\Delta B_2 = \Delta B_1 (f_1/f_2)^{1/1.2}$$

is helpful. In this equation, $\Delta B$ and $f$ represent respectively the induction swing and the operating frequency, the indices 1 and 2 denoting two different operating conditions. As is immediately apparent from the equation, an increased operating frequency with unchanged iron losses calls for a reduction of the induction swing which is less than directly proportional to the increase of the operating frequency. For example, a doubling of the operating frequency requires a reduction of the induction swing to 56% of its previous value for the iron losses to remain unchanged. At elevated operating frequencies it becomes possible to adjust the iron and copper losses so that they become approximately equal which is optimal for torque generation. Consequently, the flux density may be chosen higher than the flux density corresponding to unchanged iron losses.

The lower saturation flux density at the reluctance pole faces resulting from the above-described recessing is also advantageous in that it contributes to achieving a substantial increase of the air gap power without increasing the size of the motor.

Naturally, the recessing of the reluctance pole portions of the plates in accordance with the principle described above can be applied to motors in which the reluctance pole portions of all plates extend up to the air gap as shown in respect of the plates 11C in FIGS. 1D and 7B. If desired, the recessing may be different for neighbouring plates.

It will be understood that the coils shown in FIGS. 1A to 6A for magnetizing the pole units can also be arranged differently, e.g. as coils of transformer type surrounding the yokes between the pole groups. The stator yoke may also be divided, thereby enabling pre-wound coils to be used. Alternatively, for a yoke shaped as a section of a toroid, the coil may be sectionally toroid-wound around the yoke. It may also be economically advantageous in small motors, for example to replace two yokes that connect two pole groups together, with a single yoke with doubled cross-sectional area and have a single coil surrounding the yoke. Such arrangements are known in small shaded-pole motors and DC motors.

What is claimed is:

1. A self-starting brushless electric motor, comprising
a first motor part (11) including a plurality of pole units arranged in a first spaced-apart relation in a first pole row,
a second motor part (16) including a plurality of poles arranged in a second spaced-apart relation in a second pole row,
bearing means supporting the first motor part and the second motor part for relative movement with the first pool row confronting the second pole row across an air gap,
the first and second pole rows comprising pole types including reluctance poles and permanent-magnet poles which are polarized transversely to the air gap, and
a polyphase winding system (15) on the first motor part comprising winding coils respectively arranged in association with each pole unit to produce a magnetic field linking poles of the second pole row to poles of the first pole row through the pole unit upon energization of the coil,
at least one of the first pole row and the second pole row exhibiting a magnetic asymmetry providing a preferential relative direction of movement of the motor parts upon energization of the winding system,
wherein:
the winding system winding coils comprise at least one first-phase coil (15U) forming part of a first-phase winding and at least one additional-phase coil (15V) forming part of an additional-phase winding and
one of the pole types comprises common-type poles associated with each of the phase windings of the winding system, the common-type poles being common to all phase windings and included in at least one pole unit in each of the phase windings, and
the common-type poles of the pole units of the first pole row are spaced apart such that the relative movement of the first motor part and the second motor part includes a relative position in which
one of the common-type poles, belonging to a pole unit associated with a winding coil of one of the phase windings, is in an attracted position with respect to one of the poles of the second pole row, and
all poles of the second pole row are in non-attracted positions with respect to the common-type poles of the first pole row associated with a winding coil or coils belonging to a different one of the windings;
the common-type poles of the first pole row are reluctance poles,
the poles of the second row are substantially evenly spaced reluctance poles, and
each pole unit of the first pole row comprises a reluctance pole and a permanent-magnet pole spaced from the reluctance pole along the pole row by a distance corresponding to one-half of a spacing of poles along the second pole row;
the second pole row includes reluctance poles including an auxiliary pole part projecting from a main pole part in the preferential direction of relative movement; and
wherein the pole units of the first pole row include one of reluctance and permanent-magnet poles comprising an auxiliary pole part projecting from a main pole part in the preferential direction of relative movement.

2. The self-starting brushless electric motor, comprising
a first motor part (11) including a plurality of pole units arranged in a first spaced-apart relation in a first pole row,
a second motor part (16) including a plurality of poles arranged in a second spaced-apart relation in a second pole row,
bearing means supporting the first motor part and the second motor part for relative movement with the first pool row confronting the second pole row across an air gap,
the first and second pole rows comprising pole types including reluctance poles and permanent-magnet poles which are polarized transversely to the air gap, and
a polyphase winding system (15) on the first motor part comprising winding coils respectively arranged in association with each pole unit to produce a magnetic field linking poles of the second pole row to poles of the first pole row through the pole unit upon energization of the coil,
at least one of the first pole row and the second pole row exhibiting a magnetic asymmetry providing a preferential relative direction of movement of the motor parts upon energization of the winding system,
wherein:
the winding system winding coils comprise at least one first-phase coil (15U) forming part of a first-phase winding and at least one additional-phase coil (15V) forming part of an additional-phase winding and
one of the pole types comprises common-type poles associated with each of the phase windings of the winding system, the common-type poles being common to all phase windings and included in at least one pole unit in each of the phase windings, and the common-type poles of the pole units of the first pole row are spaced apart such that the relative movement of the first motor part and the second motor part includes a relative position in which one of the common-type poles, belonging to a pole unit associated with a winding coil of one of the phase windings, is in an attracted position with respect to one of the poles of the second pole row, and all poles of the second pole row are in non-attracted positions with respect to the common-type poles of the first pole row associated with a winding coil or coils belonging to a different one of the windings.

3. The motor according to claim 2, wherein the first pole row comprises, for each of the winding phases, at least one pair of opposed pole units.

4. The motor according to claim 2, wherein the common-type poles of the first pole row are reluctance poles, the poles of the second row are substantially evenly spaced reluctance poles, and each pole unit of the first pole row comprises a reluctance pole and a permanent-magnet pole spaced from the reluctance pole along the pole row by a distance corresponding to one-half of a spacing of poles along the second pole row.

5. The motor according to claim 4, wherein the second pole row includes reluctance poles including an auxiliary pole part projecting from a main pole part in the preferential direction of relative movement.

6. The motor according to claim 2, wherein the common-type poles of the first pole row are reluctance poles, the common-type poles of the second row are permanent-magnet poles, and each pole unit of the first pole row comprises a reluctance pole and a permanent-magnet pole spaced from the reluctance pole along the pole row by a distance corresponding to one-half of a spacing of like-polarity poles along the second pole row.

7. The motor according to claim 6, wherein the permanent-magnet poles of the second pole row comprise an auxiliary pole part projecting from a main pole part in the preferential direction of relative movement.

8. The motor according to claim 2, wherein the common-type poles of the first pole row are permanent-magnet poles, each pole unit of the first pole row comprises at least one pair of permanent-magnet poles, permanent-magnet poles adjacent along the first pole row in each pole unit being of opposite polarities and spaced apart along the first pole row by a distance corresponding to one-half of a spacing of poles along the second pole row, and the pole units of the first pole row comprise only permanent-magnet poles.

9. The motor according to claim 2, in which the first pole row comprises, for each winding phase, at least one pair of opposed pole units, wherein the pole units of the first pole row are unequally spaced-apart along the pole row such that the pair of opposed pole units belonging to a given winding phase are spaced differently from an intervening pole unit belonging to a different winding phase (FIG. 4).

10. The motor according to claim 2, wherein the first motor part is a stator and the second motor part is a rotor supported for rotation within the stator (FIGS. 1–6).

11. The motor according to claim 2, wherein each of the pole units comprises three poles, and each of the three poles includes: a pair, of a first one of the pole types; and exactly one, of a second one of the pole types;

whereby, along the first row, no pole of the second one of the pole types occurs between two adjacent pole units.

12. The motor according to claim 11, wherein the first one of the pole types is the reluctance poles and the second one of the pole types is the permanent-magnet poles.

13. The motor according to claim 2, wherein an angular spacing of the pole units is not any multiple of an angular spacing of the poles in the first pole row.

* * * * *